(12) United States Patent
Hinc et al.

(10) Patent No.: US 8,312,908 B2
(45) Date of Patent: Nov. 20, 2012

(54) DEVICE FOR REGULATING THE DELIVERY RATE OF A LINEAR ELEMENT

(75) Inventors: Henri Hinc, Romagnat (FR);
Dominique Leblanc, Mozac (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 919 days.

(21) Appl. No.: 12/328,418

(22) Filed: Dec. 4, 2008

(65) Prior Publication Data

US 2009/0152388 A1 Jun. 18, 2009

(30) Foreign Application Priority Data

Dec. 7, 2007 (FR) ...................................... 07 59654

(51) Int. Cl.
*B29D 30/08* (2006.01)

(52) U.S. Cl. .................. 156/397; 156/394.1; 156/398; 156/414; 156/415; 156/416; 156/417; 254/272; 254/275; 254/277; 254/327; 254/335; 254/336; 254/337; 254/338; 254/392; 254/393; 254/396; 254/398

(58) Field of Classification Search ............... 156/394.1, 156/397, 398, 414, 415, 416, 417; 254/272, 254/275, 277, 327, 335, 336, 337, 338, 392, 254/393, 396, 398
See application file for complete search history.

(56) References Cited

U.S. PATENT DOCUMENTS

| | | | | |
|---|---|---|---|---|
| 4,435,236 A | * | 3/1984 | Inae et al. ..................... | 156/132 |
| 5,863,368 A | * | 1/1999 | Perrin ........................... | 156/177 |
| 6,463,978 B2 | * | 10/2002 | Mayet ........................... | 156/397 |
| 7,389,973 B1 | * | 6/2008 | Chou et al. .................... | 254/277 |

* cited by examiner

*Primary Examiner* — Richard Crispino
*Assistant Examiner* — Joshel Rivera
(74) *Attorney, Agent, or Firm* — Cozen O'Connor

(57) ABSTRACT

A device for adjusting the delivery rate of a linear element. The device forms a delivery path for the linear element between an inlet to the device at a delivery rate that is substantially constant and an outlet from the device at a delivery rate that is variable and substantially periodic and varies the length of the path of the linear element in application of a predetermined periodic relationship. The device includes a plurality of pulleys movable in rectilinear translation periodically in sinusoidal manner.

15 Claims, 4 Drawing Sheets

DEVICE FOR REGULATING THE DELIVERY RATE OF A LINEAR ELEMENT

RELATED APPLICATION

This application claims the priority of French patent application Ser. No. 07/59654 filed Dec. 7, 2007.

FIELD OF THE INVENTION

The present invention relates to fabricating a tire reinforced by a radial carcass ply.

BACKGROUND OF THE INVENTION

An installation for fabricating a reinforced tire is known in which the carcass ply is made from a single continuous yarn that is laid radially back and forth between two bead wires of a tire blank.

The yarn, previously stored on a reel, is laid on the blank by a laying member including a head that is moved with reciprocating motion along a substantially circular path around the blank. The term "yarn" should be understood very generally, covering any linear element whether single or multifilament, a cord, a twist, or any equivalent assembly, and regardless of the (metal or other) material constituting the yarn, and regardless of the treatment to which it might be subjected, for example surface treatment for enhancing intimate bonding with rubber, or indeed rubberizing treatment surrounding said yarn in a layer of rubber so as to enable it to adhere directly on the tire blank.

The known method uses a stationary reel. The yarn is unreeled from the reel under the effect of the tension exerted by the yarn, depending on the yarn requirements of the laying member. In order to ensure that the yarn does not unreel too quickly from the reel, which would have the drawback of reducing the tension with which the yarn is laid, members are used that rub against the yarn and that oppose unreeling of the yarn from the reel.

However the yarn is generally coated in a layer of adhesive so the rubbing members lead to the layer of adhesive, being stripped from the yarn and that can run the risk of the installation becoming clogged.

A solution to that problem might consist in using a moving reel with its rotation being controlled to unwind a quantity of yarn as required for feeding the laying member. That would make it possible to omit using rubbing members. Nevertheless, given the reciprocating laying motion and the shape of the blank, the delivery rate required for feeding yarn to the laying member is variable. That makes it particularly complicated to control the speed of rotation of the reel.

OBJECT AND SUMMARY OF THE INVENTION

An object of the invention is specifically to overcome those drawbacks.

To this end, one aspect of the invention is directed to a device for regulating the delivery rate of a linear element for fabricating a tire, wherein the device comprises path-forming means forming a delivery path for the linear element between an inlet to the device at substantially constant delivery rate and an outlet from the device at a rate that varies and that is substantially periodic, the path being of length that is variable in application of a predetermined periodic relationship, said path-forming means comprising:

a plurality of deflection pulleys for deflecting the linear element, each pulley being movable in rectilinear translation in a common direction;

means for moving the pulleys and arranged to move them in sinusoidal translation motion of frequency that is a multiple of the frequency of the delivery rate of the linear element, the period of the motion of the at least one pulley, referred to as a driving pulley, being equal to the period of the delivery rate of the linear element;

means for coupling the movements of the pulleys, said means being arranged in such a manner that the motion frequency of each pulley is an integer multiple of the motion frequency of the drive pulley; and for each pulley, means for adjusting the amplitude of its movement in translation.

In other words, the device for regulating the delivery rate of a linear element comprises means forming a delivery path for the linear element between an inlet to the device where the delivery rate is substantially constant and outlet from the device where the delivery rate is variable and substantially periodic, together with means for causing the length of the path of the linear element in the device to vary in application of a predetermined periodic relationship.

The term "linear element" is used to mean any element that extends in a main direction, for example a yarn, a strip, or a tape.

The above-described device makes it possible to use a reel of yarn that is unwounded at constant speed for feeding a member for laying the yarn on a tire blank at a delivery rate that is variable and substantially periodic. For this purpose, such a device is interposed between the reel and the laying member.

To determine the periodic relationship, use is made of the fact that the variable speed can readily be calculated as a function of the laying frequency of the yarn and the shape of the blank. The constant speed used for controlling rotation of the reel corresponds to the average value of the variable speed.

By varying the path length of the linear element within the device, it is ensured that the yarn is continuously under tension while the yarn is being laid on the blank, without there being any need to use a rubbing device.

A device according to an embodiment of the invention may also include one or more of the following characteristics.

The means forming the path for the linear element comprise at least one moving deflector pulley for deflecting the linear element. The pulley serves to guide the linear element inside the device and thus to determine its path.

The means for varying the path length include means for moving the pulley with periodic motion. By moving the pulley, the guidance of the linear element is modified, thereby modifying in particular the length of the path of the element through the device.

The periodic motion of the pulley is determined so as to compensate for the variations in the delivery rate at the outlet from the device. Given that the inlet and outlet delivery rates of the linear element are well known, it is possible to set parameters for the motion of the pulley to compensate for the variations in delivery rates.

The means for moving each pulley comprise:
a support slide forming a support for the pulley and movable in translation;
a drive shaft for driving the slide; and
coupling means for coupling the slide with the shaft to transform the rotary motion of the shaft into periodic motion in translation of the slide.

It is advantageous for the pulley to move in translation since movement in translation is easy to reproduce and its parameters can be set easily.

The coupling means are of the crank and connecting rod type, of the cam and cam follower type, or of the crank and guide slot type. These various types of coupling enabling the rotary motion of the shaft to be transformed into movement in translation of the slide.

When the coupling means are of the crank and guide slot type, they comprise:
  a crank-forming drive wheel carried at one of the ends of the shaft and radially offset from a main axis of the shaft; and
  a guide slot formed in the slide and extending substantially orthogonally to the direction in which the slide moves in translation, and in which the wheel is engaged;
in such a manner that when the shaft revolves at constant speed, the motion of the slide is sinusoidal. It is advantageous to use coupling means of the crank and guide slot type since such means enable sinusoidal motion to be obtained for the slide. Sinusoidal motion constitutes elementary motion that is particularly advantageous since it enables a periodic motion to be resolved into a Fourier series.

The device includes means for modifying the radial offset of the wheel, thereby forming means for adjusting the amplitude of the movement in translation of the pulley, so as to adjust the amplitude of the movement in translation of the slide.

The device has a plurality of pulleys, preferably three pulleys, with respective drive shafts for the pulleys being coupled to one another so that the shaft of the drive pulley is a drive shaft and the shafts of the pulleys are coupled together in pairs by means providing step-down gearing relative to the drive shaft.

The speeds of rotation of the shafts are distinct from one another and are multiples of the speed of the drive shaft. This makes it possible for the speeds of rotation of the shafts to be harmonics of the speed of a drive shaft.

The period of the rotary motion of the drive shaft is substantially equal to the period of the variable and substantially periodic delivery rate. Thus, the period of the motion of the pulley associated with the drive shaft corresponds to the fundamental period of the delivery rate of the linear element, and the periods of the other shafts correspond to harmonics of said rate.

Another aspect of the invention is directed to an installation for radially laying a linear element on a tire blank, the installation including a regulator device as defined above.

An installation according to an embodiment of the invention may also include one or more of the following characteristics.

The installation comprises:
  a reel forming a support on which the linear element is reeled;
  a member for laying the linear element on the blank at a rate that is variable and substantially periodic, the member comprising a laying head and means for moving the head;
  means for unwinding the linear element from the reel by causing it to move at a substantially constant delivery rate; and
  the delivery rate regulator device interposed between the reel and the laying member.

The installation includes coupling means for coupling the means for moving the head with the means for causing the path length of the linear element to vary.

The installation includes coupling means for coupling the means for moving the head with the means for unreeling the linear element.

Another aspect of the invention is directed to a method of adjusting a device as defined above in order to regulate the delivery rate of a linear element being delivered at a rate that is variable and substantially periodic, the method comprising the following steps:
  resolving the periodic delivery rate of the linear element into a Fourier series of order $\bar{n}$ in order to determine the Fourier coefficients of the first $\bar{n}$ harmonics;
  using a device having $\bar{n}$ deflector pulleys; and
  adjusting the amplitudes of the movement in translation of the deflector pulleys in such a manner that for a pulley having motion at a frequency equal to $\bar{m}$ times the frequency of the motion of the drive pulley, the amplitude of its movement in translation is set as a function of the $m^{th}$ Fourier coefficient.

BRIEF DESCRIPTION OF THE DRAWINGS

The invention can be better understood on reading the following description given purely by way of example and made with reference to the accompanying drawings, in which.

MORE DETAILED DESCRIPTION

Figure 1:
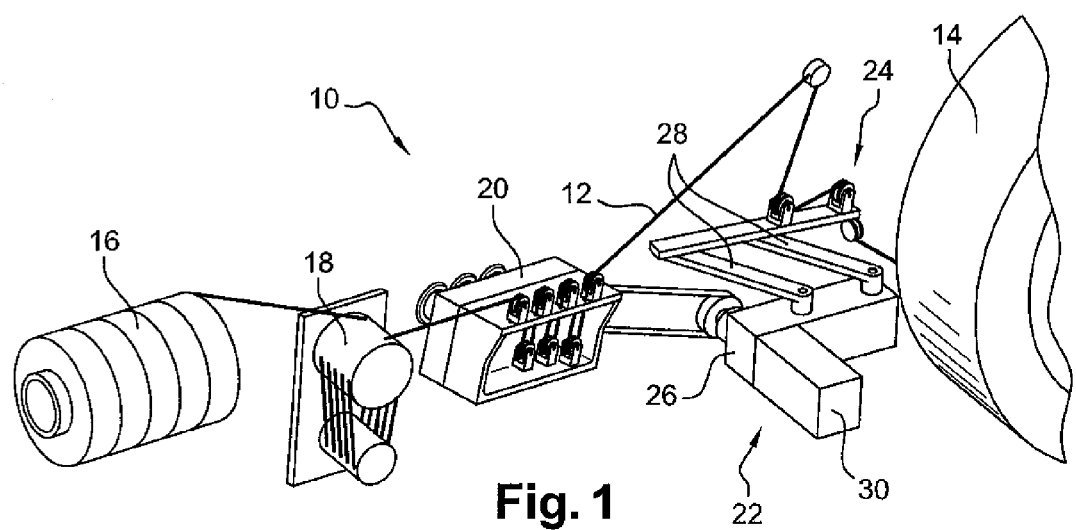
FIG. 1 is a view of a laying installation of the invention.

FIG. 1 shows an installation 10 of the invention for laying a yarn 12 radially on a tire blank 14.

The yarn 12 may for example be a metal wire for forming the carcass-reinforcing ply of the tire blank 14. The wire may optionally be coated in rubber so as to improve its adhesion.

The installation 10 comprises a reel 16 on which the yarn 12 is wound, yarn-tensioner means 18, of the capstan type, a device 20 of the invention for regulating the delivery rate of the yarn 12, and a member 22 for periodically laying the yarn 12 on the blank 14.

The reel 16 is designed to be unwounded at constant speed. To this end, the system includes means (not shown) for unwinding the reel at constant speed.

The member 22 comprises a laying head mounted to move relative to a frame 26 of the member 22. The head 24 is connected to the support 26 via two arms 28 arranged in such a manner that the head 24 is movable along a circular path about the tire blank 24.

The member 22 also includes a motor 30 for driving the head 24 with reciprocating motion having half period T. The assembly comprising the motor 30 and the arms 28 form means for moving the head 24.

Figure 2:
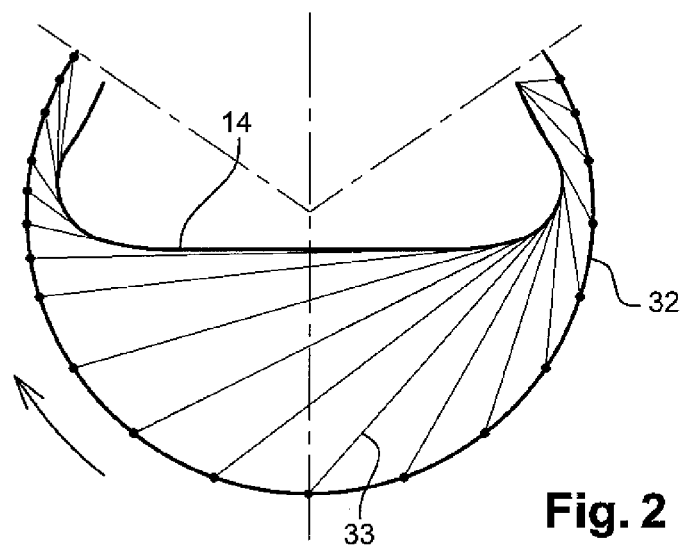
FIG. 2 is a diagram showing the path followed by the yarn around the tire blank during laying.

FIG. 2 shows the outline of the blank 14 in a horizontal section plane. The outline of the blank extends between two reinforcements for the bottom zone of the tire. FIG. 2 also shows the path 32 followed by the head 24 during its reciprocating motion about the blank 14. As specified above, the path 32 is substantially circular.

The positions successively occupied by the head 24 during its clockwise movement are represented by points placed on the path 32. Successive pairs of points shown in FIG. 2 are spaced apart by a time interval that is constant.

FIG. 2 also shows the portion 33 of yarn 12 connecting the head 24 to the blank 14 at each instant.

Because of the particular shape of the blank 14, the delivery rate of the yarn 12 at the outlet from the head 24 varies over time. Similarly, the speed at which the yarn 12 is laid on the surface of the blank 14 varies over time.

Figure 3A:
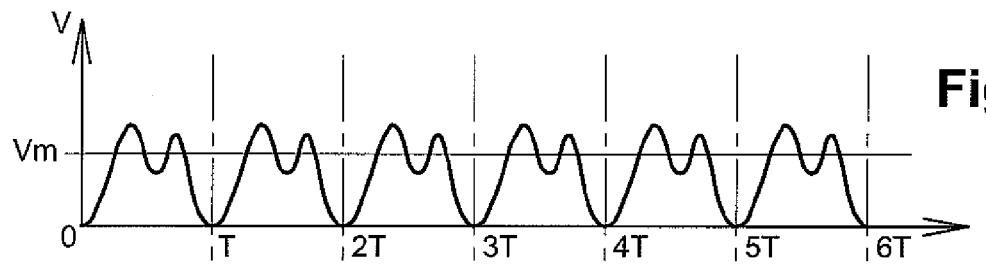
FIGS. 3a and 3b are graphs showing respectively how the laying speed of the yarn on the blank and the delivery rate of the yarn at the outlet from the laying member vary over time.

The graph of FIG. 3a shows how the instantaneous speed V at which the yarn is laid on the surface of the blank 14 varies over time. This graph also shows the average speed Vm at which the yarn is laid. It can be seen that this variation is periodic of period T corresponding to the time taken to lay a reinforcing yarn from one bottom zone of the blank to the other. It can also be seen that the profile of the speed is the same whether the yarn 12 is being laid in one direction or the other. This is due to the fact that in the example shown in FIG. 2, the blank 14 is symmetrical about a midplane.

It can be seen that at multiple instants of the period T, the speed at which the yarn is being laid on the blank is zero. At these precise instants, the head 24 of the member 22 is level with the bead wires of the blank 14 and is changing direction. Consequently its speed is zero.

Figure 3B:
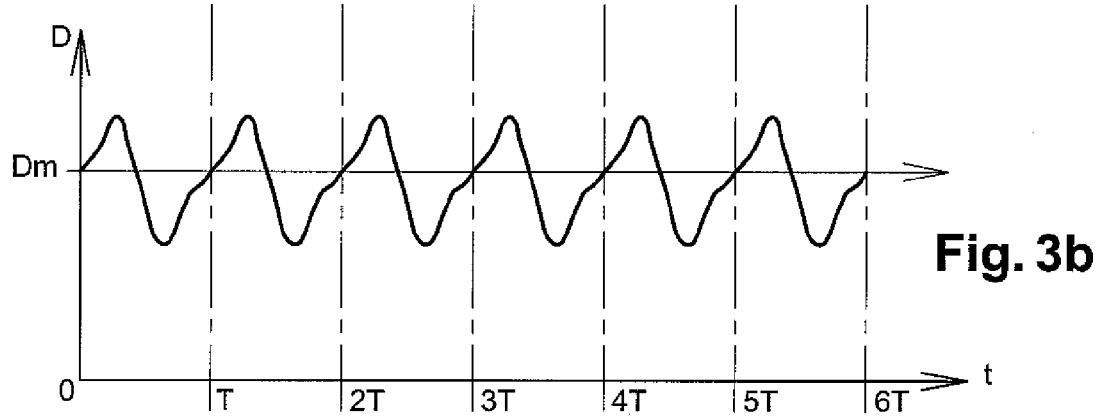
Figure 4:
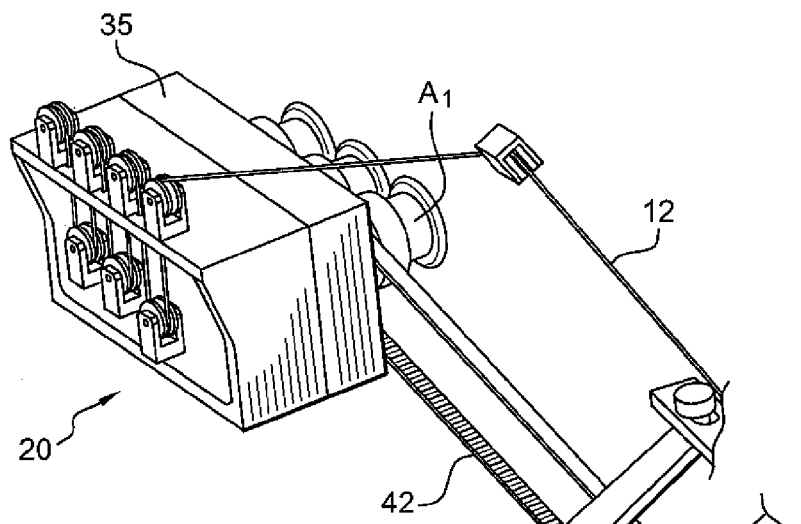
FIGS. 4 to 7 are detail views of the regulation device of the FIG. 1 installation.
Figure 4:
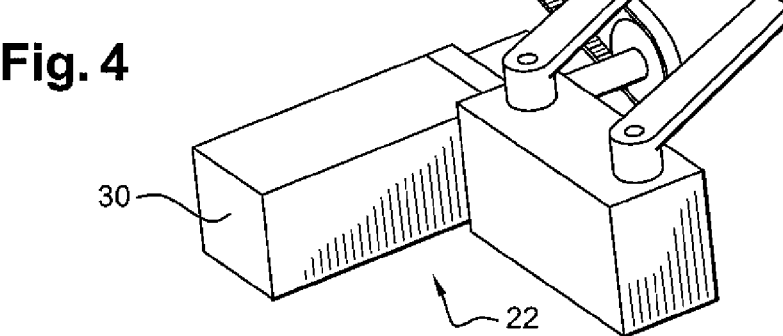

FIG. 3b shows the way in which the travel speed of the yarn 12 at the outlet from the head 24 varies over time. This variation is periodic with period T and it oscillates about an average rate Dm. This value for the average rate is naturally a function of the period T and must be equal to the delivery rate of the yarn at the outlet from the reel 16.

It can thus be seen that at the outlet from the reel 16, the yarn 12 travels at a first rate Dm that is substantially constant, whereas at the laying head 24, the yarn 12 travels at a second rate D that varies substantially periodically with period T.

The regulator device 20 of the invention serves in particular to manage these delivery rates differently. The device 20 can also be thought of as a device for compensating delivery rate variations.

The device 20 comprises a frame 35 and a plurality of deflector pulleys 34 for guiding and forming the path along which the yarn 12 travels inside the frame 35. Some of the pulleys 34 are movable so as to form means for varying the length of the path of the yarn 12 inside the frame 35.

The device 20 has three moving pulleys P1, P2, and P3. Each moving pulley is associated with respective mover means for imposing predetermined motion on the pulleys. The mover means for the first pulley P1 are described in greater detail below. The mover means for the other pulleys are identical thereto. In order to understand the description below, a rectangular frame of reference is used in which the axes of the pulleys P1, P2, and P3 are oriented in a Y direction.

Figure 5:
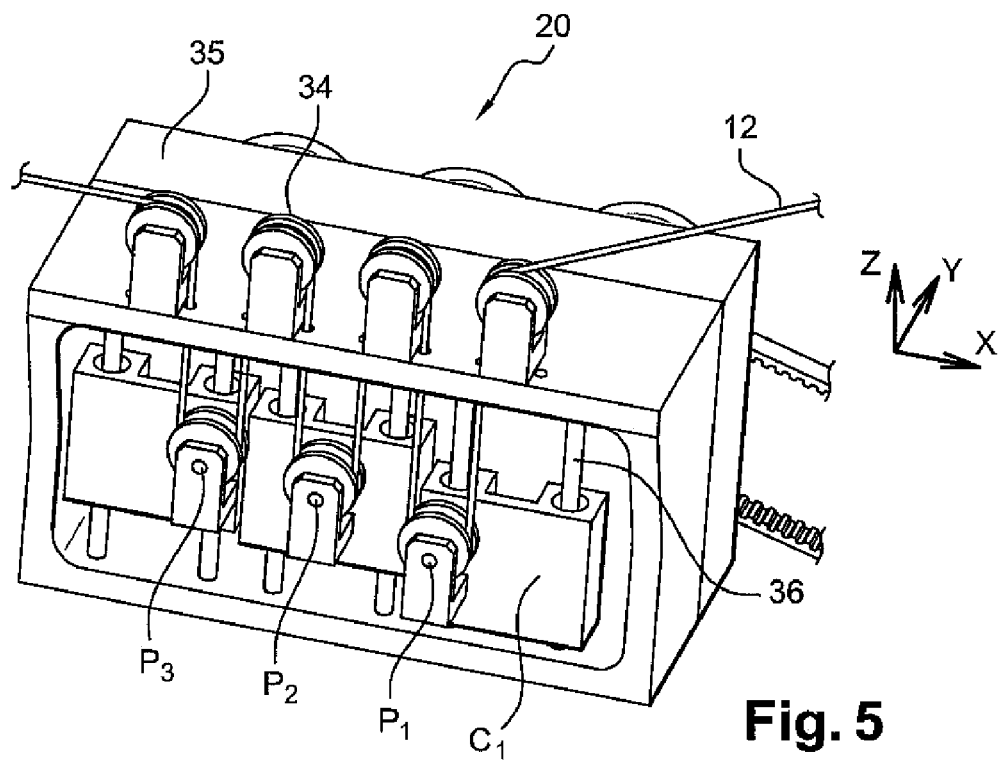
Figure 6:
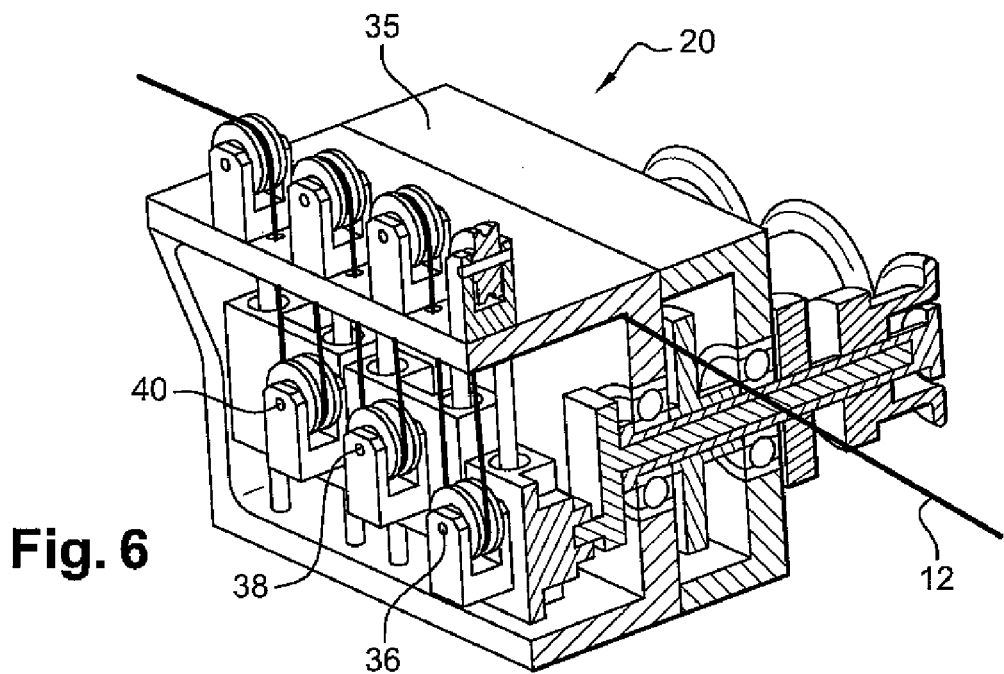
Figure 7:
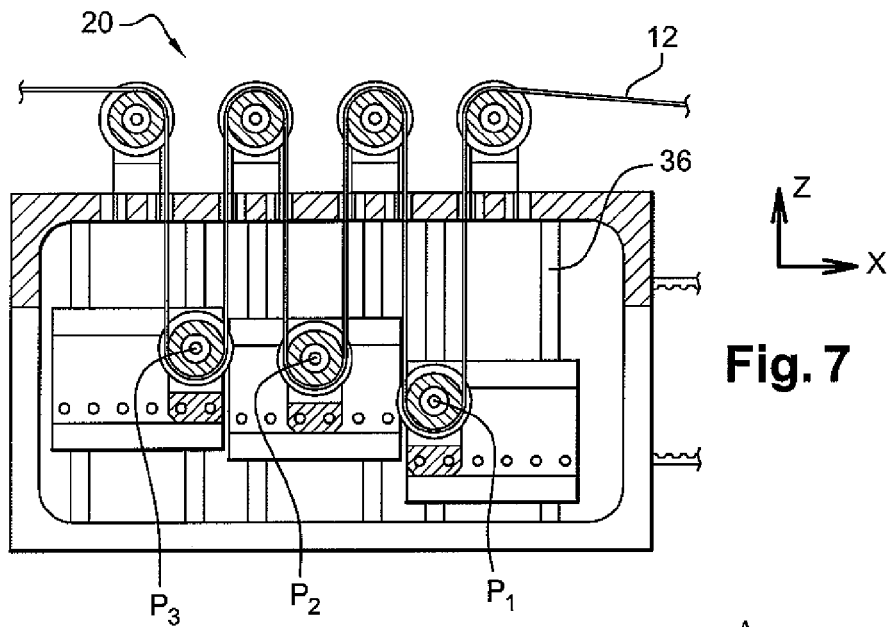

The means for moving the pulley P1 comprise a slide C1 forming a support for the pulley and movable in translation relative to the frame 35 in a direction that corresponds substantially to a Z direction of said frame of reference. For this purpose, and as shown in FIGS. 5 and 7, the frame 35 includes guide rails 36 for guiding the slide C1 and designed to be received in orifices formed through the slide C1. The pulley P1 can move in translation relative to the slide C1 about a Y axis that is substantially horizontal and orthogonal to the Z direction of the frame of reference.

The mover means for the pulley P1 also comprise a shaft A1 for driving the slide and designed to be driven in rotation about its main Y-axis direction relative to the frame 35 of the device 30.

Finally, the means for moving the pulley P1 comprise means for coupling the slide C1 with the shaft A1. These coupling means are of the crank and guide slot type and comprise a crank-forming drive wheel G1 carried at one end of the shaft A1 and radially offset from the main axis of the shaft A1; together with a guide slot R1 formed in the slide C1 and extending substantially orthogonally to the Z direction in which the slide moves in translation, i.e. oriented in the X direction. The wheel G2 is engaged in the slot R1.

Under the effect of the shaft A1 rotating about the Y direction, the wheel G1 slides along the slot R1 and drives the slide C1 to move periodically in translation along the Z direction. This translation movement is substantially sinusoidal when the shaft rotates at constant speed. The frequency of this motion is determined by the speed of rotation of the shaft A1. The amplitude of the movement in translation of the slide C1 can be adjusted by modifying the radial offset of the wheel G1 relative to the main axis of the shaft A1.

The main directions of the three shafts A1, A2, and A3 are substantially parallel to one another, i.e. parallel to the Y direction. Similarly, the directions in which the slides C1, C2, and C3 move in translation are substantially parallel to the Z direction.

Figure 8:
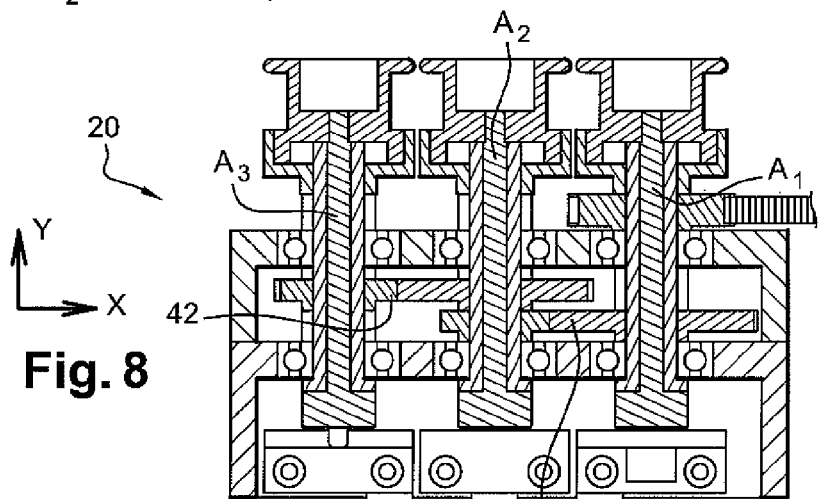
FIG. 8 is a horizontal section view of the regulation device of the invention.
Figure 9:
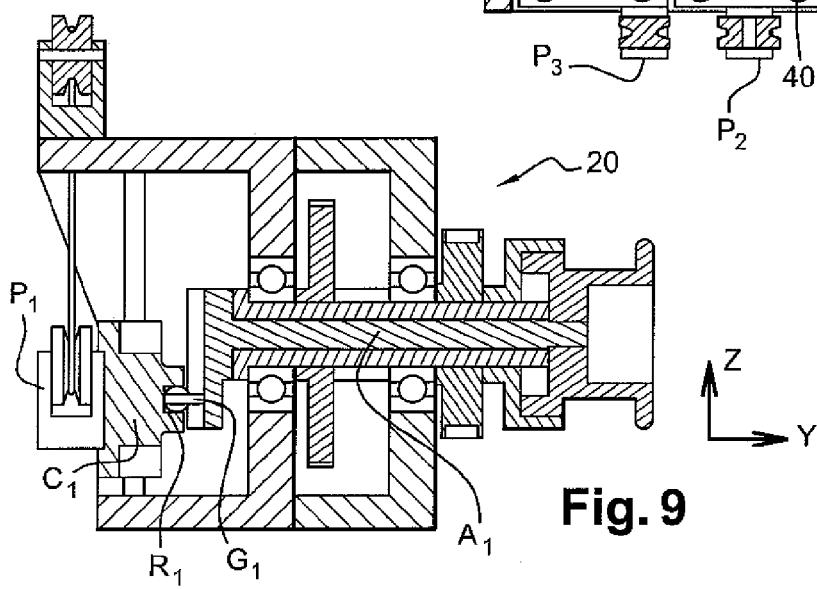
FIG. 9 is a vertical section view of the regulation device of the invention.

Furthermore, the shafts A1, A2, and A3 are coupled in rotation with one another by means of gears 40 and 42 that are visible in FIG. 8 and that are interposed respectively between the shafts A1 and A2 and between the shafts A2 and A3. The relative speeds of the shafts A1, A2, and A3 can easily be adjusted as a function of the gear ratios, thus forming step-down gear means.

It is also possible to adjust the phase differences between the shafts relative to one another in simple manner by acting on the gears.

From the above description, it can be seen that it is possible to adjust the device 20 in terms of the amplitude of the movement of each slide and also in terms of the relative frequencies and phases of the slides. The way in which the device 20 is adjusted is described below.

From the graph of FIG. 3, the delivery rate of the yarn 12 at the laying head 24, which is equivalent to the delivery rate at the yarn outlet from the device 20, is periodic with period T. This function can be resolved as a Fourier series of order n. In the example shown, this is restricted to order n=3. The resolution may be calculated or it may be obtained using fast Fourier transform software.

The Fourier transform of the way in which the delivery rate varies over time is written H. The function H can be written as follows:

$$H = H0 + H1 + H2 + H3$$

where:

H0 is a constant and depends on the value Dm of the mean delivery rate of the yarn. The other terms are expressed in the following form:

$$H1 = a1 \cdot \sin[2\pi \times 1 \times 1/T) + \phi1]$$

$$H2 = a2 \cdot \sin[2\pi \times 2 \times 1/T) + \phi2]$$

$$H3 = a3 \cdot \sin[2\pi \times 3 \times 1/T) + \phi3]$$

The function of the regulator device 20 is to compensate for the delivery rate differences of the yarn 12 going through the head 24 compared with the mean delivery rate Dm as obtained at the outlet from the reel 16. It thus implements compensation relative to the functions H1, H2, and H3.

The compensation function for the regulation device 20 is written S. S is expressed as follows:

$$S = S1 + S2 + S3$$

with:

$$S1 = H1 = a1 \cdot \sin[2\pi \times 1 \times 1/T) + \phi 1 + \pi]$$

$$S2 = H2 = a2 \cdot \sin[2\pi \times 2 \times 1/T) + \phi 2 + \pi]$$

$$S3 = H3 = a3 \cdot \sin[2\pi \times 3 \times 1/T) + \phi 3 + \pi]$$

Thereafter, it suffices to set the parameters of the regulator device 20 in such a manner that the respective values of the amplitudes of the slides C1, C2, C3 are equal to the coefficients a1, a2, and a3, and the phase differences between the various slides are respectively equal to $\phi 1$, $\phi 2$, and $\phi 3$, and the motion periods of the slides C1, C2, and C3 are respectively equal to T, T/2, and T/3.

To make the period of the motion of the slide C1 equal to the period T of the motion of the head 24 about the blank 14, the motor 30 of the member 22 is connected to the shaft A1 by means of a coupling belt 42 forming means for coupling the head drive means with the means for varying the length of the path of the linear element.

The means for unwinding the reel 16 are connected to the motor 30 of the member 22 so that the unwinding speed of the yarn from the reel is substantially equal to the mean delivery rate of the yarn from the head 24.

It should be observed that the device 20 of the invention has the effect merely of keeping the tension in the yarn 12 constant within the system by the variations it imposes on the path length of the yarn. The tension in the yarn 12 is determined by the capstan 18. The capstan 18 is capable of operating even when the yarn is traveling at high speed since the speed of the yarn in the capstan is constant.

The invention is described above with reference to a regulator device comprising three moving pulleys. In most cases, the use of three pulleys provides an adequate approximation to the variations in the yarn delivery rate, and thus serves to compensate appropriately the yarn delivery rate differences between the outlet from the reel and the laying head. Nevertheless, for certain particular shapes of tire blank 14, it can be necessary to use a larger number of moving pulleys in order to improve the accuracy of the compensation. Under such circumstances, additional moving pulleys are added to the regulator device, and a Fourier series is calculated of order equal to the number of moving pulleys, and each of the pulleys is adjusted in the same manner as that described above.

Although the regulator device of the invention is described above as serving to compensate the delivery speed of a linear element from a speed that is substantially constant to a speed that is substantially varying, the device can equally well be used in the opposite direction, i.e. to compensate a delivery speed from a variable speed to a speed that is substantially constant.

Finally, the invention is described with reference to the delivery speed of a yarn for making a carcass ply. The invention also applies when the linear element is a strip of material, e.g. a rubber strip.

What is claimed is:

1. A device for regulating the delivery rate of a linear element for fabricating a tire, wherein the device comprises path-forming means forming a delivery path for the linear element between an inlet to the device at substantially constant delivery rate and an outlet from the device at a rate that varies and that is substantially periodic, the path being of length that is variable in application of a predetermined periodic relationship, said path-forming means comprising:

a plurality of deflection pulleys for deflecting the linear element, each pulley being movable in rectilinear translation in a common direction;

means for moving each of the pulleys in sinusoidal translation motion with a frequency that is a multiple of the frequency of the delivery rate of the linear element, the frequency of the motion of one pulley, referred to as a driving pulley, being equal to the frequency of the delivery rate of the linear element;

means for a motion and frequency coupling of the sinusoidal translation of the different pulleys with frequencies that are different from each other, wherein the frequency of each pulley is an integer multiple of the motion frequency of the drive pulley; and for each pulley, means for adjusting the amplitude of its movement in translation.

2. The device according to claim 1, further comprising means for compensating for the variations in the delivery rate at the outlet from the device based on the period motion of the pulleys.

3. The device according to claim 2, wherein the means for moving each pulley comprise:

a support slide forming a support for the pulley and movable in translation;

a drive shaft for driving the slide; and coupling means for coupling the slide with the shaft to transform the rotary motion of the shaft into periodic motion in translation of the slide.

4. The device according to claim 3, wherein the coupling means are of the crank and coupling rod type or the crank and guide slot type.

5. The device according to claim 4, wherein the coupling means are of the crank and guide slot type and comprise:

a crank-forming drive wheel carried at one of the ends of the shaft and radially offset from a main axis of the shaft; and a guide slot formed in the slide and extending substantially orthogonally to the direction in which the slide moves in translation, and in which the wheel is engaged;

in such a manner that when the shaft revolves at constant speed, the motion of the slide is sinusoidal.

6. The device according to claim 5, including means for modifying the radical offset of the wheel thereby forming means for adjusting the amplitude of the movement in translation of the pulley.

7. The device according to claim 1, wherein the respective drive shafts of the pulleys are coupled to one another so that the shaft of the drive pulley is a drive shaft and the shafts of the pulleys are coupled together in pairs by means for gearing down relative to the drive shaft.

8. The device according to claim 7, wherein the speeds of rotation of the shafts are distinct from one another and are integer multiples of the speed of the drive shaft.

9. The device according to claim 7, wherein the period of rotation of the drive shaft is substantially equal to the period of the variable delivery rate that is substantially periodic.

10. An installation for radially laying a linear element on a tire blank, wherein the installation includes the regulator device according to claim 1.

11. The installation according to claim 10, further comprising:

a reel forming a support on which the linear element is reeled;

a member for laying the linear element on the blank at a rate that is variable and substantially periodic, the member comprising a laying head and means for moving the head;

an unreeling unit for unreeling the linear element from the reel by causing it to move at a substantially constant delivery rate; and the delivery rate regulator device interposed between the reel and the laying member.

12. The installation according to claim 11, including coupling means for coupling the means for moving the head with the means for causing the length of the path of the linear element to vary.

13. The installation according to claim 11, including coupling means for coupling the means for moving the head with the means for unreeling the linear element from the reel.

14. The device according to claim 1, comprising:
at least three pulleys, the at least three pulleys including:
a driving pulley;
a second pulley, coupled in translation sinusoidal motion to the driving pulley with a frequency that is twice a frequency of the driving pulley;
a third pulley, coupled in translation sinusoidal motion to the second pulley with a frequency that is three times the frequency of the driving pulley.

15. An installation for radially laying a linear element on a tire blank, comprising:
the regulator device according to claim 1;
a reel forming a support on which the linear element is reeled, the reel being rotatable for unreeling the linear element;
a member for laying the linear element on the blank at a rate that is variable and substantially periodic, the member comprising a laying head and means for moving the head,
wherein the regulator device is interposed between the reel and the member for laying.

* * * * *